No. 627,913. Patented June 27, 1899.
F. F. FLETCHER.
BREECH MECHANISM FOR QUICK FIRING GUNS.
(Application filed Apr. 7, 1898.)
(No Model.) 5 Sheets—Sheet 1.

No. 627,913. Patented June 27, 1899.
F. F. FLETCHER.
BREECH MECHANISM FOR QUICK FIRING GUNS.
(Application filed Apr. 7, 1898.)
(No Model.) 5 Sheets—Sheet 2.

Witnesses
Percy C. Bowen
John Chalmers Wilson

Inventor
F. F. Fletcher,
by Wilkinson & Fisher,
Attorneys.

No. 627,913. Patented June 27, 1899.
F. F. FLETCHER.
BREECH MECHANISM FOR QUICK FIRING GUNS.
(Application filed Apr. 7, 1898.)
(No Model.) 5 Sheets—Sheet 3.

Witnesses
Percy C. Bowen
John Chalmers Wilson Inventor
F. F. Fletcher,
by Wilkinson & Fisher,
Attorneys.

THE NORRIS PETERS CO., PHOTO-LITHO., WASHINGTON, D. C.

No. 627,913. Patented June 27, 1899.
F. F. FLETCHER.
BREECH MECHANISM FOR QUICK FIRING GUNS.
(Application filed Apr. 7, 1898.)

(No Model.) 5 Sheets—Sheet 4.

Witnesses
Percy C. Bowen
John Chalmers Wilson

Inventor
F. F. Fletcher
by Wilkinson & Fisher
Attorneys

THE NORRIS PETERS CO., PHOTO-LITHO., WASHINGTON, D. C.

UNITED STATES PATENT OFFICE.

FRANK F. FLETCHER, OF THE UNITED STATES NAVY.

BREECH MECHANISM FOR QUICK-FIRING GUNS.

SPECIFICATION forming part of Letters Patent No. 627,913, dated June 27, 1899.

Application filed April 7, 1898. Serial No. 676,814. (No model.)

*To all whom it may concern:*

Be it known that I, FRANK F. FLETCHER, lieutenant in the United States Navy, and a citizen of the United States, residing at Washington, in the District of Columbia, have invented certain new and useful Improvements in Breech Mechanism for Quick-Firing Guns; and I do hereby declare the following to be a full, clear, and exact description of the invention, such as will enable others skilled in the art to which it appertains to make and use the same.

My invention relates to improvements in breech mechanism for quick-firing guns of the slotted-screw system of fermeture, and particularly relates to the manner of operating the screw-plug, to means for firing the gun, and to provision for facilitating the operation of loading the gun.

The invention includes the application of mechanism whereby the continuous rotation of a crank removes the screw-plug from the gun, operates the firing device, so as to eject the primer, and throws into position a protecting-tray to preserve the screw-threads of the gun from injury in loading the gun. The rotation of the crank in the opposite direction serves to remove the protecting-tray from the gun, to lock the plug in the gun, and to bring the firing device into operation. While these three results are simultaneously accomplished in the herein-described mechanism, it is my purpose to use the same conjointly or severally as occasion may require.

Nearly all of the so-called "rapid-firing" guns have the breech-plug operated by means of a lever across the rear face of the breech of the gun. With this arrangement it is necessary for the man who operates the lever to step from his position in rear of or to one side of the gun in order to reach the lever-handle to open the plug. This is a manifest disadvantage and an unnecessary waste of time for the operator to move from one point to another before the gun can be fired and after it has been fired before it can be reloaded. It is even a greater disadvantage to require the operator to expose himself in rear of the gun in the operation of closing the lever. In this case a gun-pointer cannot fire the gun until he is assured that the breech-operator is free from the recoil of the gun, thus causing delay in firing the gun or else exposing the breech-operator to the risk of being struck by the gun on recoil. In my invention I overcome this disadvantage by providing the breech-opening mechanism that will be hereinafter described and claimed.

Reference is had to the accompanying drawings, in which the same parts are indicated by the same letters throughout the several views.

Fig. 13ª represents a rear view of the tray in the elevated position, or that position in which it projects into the screw-box of the gun.

A represents the gun-body, provided with the interrupted screw-box A', cut away to the rear and in the form of a truncated cone $A^2$ to receive the carrier-ring and provided with the recess s $A^3$ for the lugs C' of the carrier-ring and with the recess $A^4$ to receive the segmental worm for rotating the breech-block in the carrier-ring and for swinging the said ring outward. The lower portion of the gun-body is also recessed, as at $A^5$ and $A^6$, for the protecting-tray. Furthermore, the conical chamber $A^2$ is provided with a recess $a$ and, preferably, with an opening $a'$ leading therefrom for the stop-bolt.

B represents the breech-block, which is provided with the obturator B' and stem $B^2$, perforated with the vent $b^0$. This breech-block is provided with screw-threads $b'$, engaging with those of the screw-box A', also with the annular rib $b^0$ on the rear face to engage in the carrier-ring in rear of the blanks thereon and with the worm-teeth $b$.

C represents the carrier-ring, which is provided with two laterally-projecting lugs C' on which the said carrier-ring is pivoted, as by means of the hinge bolt or shaft D, journaled in the side of the breech. This carrier-ring C is provided with the guide-lugs $c$ and $c'$, which project into the blanks between the teeth $b'$ on the breech-block. This carrier-ring is loosely mounted on the shaft D, with the lugs C' embracing the segmental worm-gear $D^2$, fast on the said shaft. The shaft also carries the miter-gear D' and the interrupted worm-gear $D^3$, having the worm-teeth $d^2$ and the interrupted annular rib $d^3$. The shaft D is rotated by means of the miter-gear D' on the shaft D and the hand-crank F, having the handle F', though any other means for rotating the same shaft D may be adopted, if desired.

The segmental worm-gear $D^2$ is provided with worm-teeth $d$ engaging the teeth $b$ of the breech-block to rotate the latter, and with teeth $d'$, which engage the teeth $b'$ on the breech-block after the worm-teeth have passed out of engagement with each other. In this manner the breech-block is first turned about its axis by means of the worm-teeth $b$ and $d$ and then run the requisite distance to the rear in the carrier-ring by means of the teeth $b'$ and $d'$. As soon as the teeth $d'$ have moved the breech-block sufficiently to the rear in the carrier-ring the further motion of the breech block rearward relative to the carrier-ring is arrested and the carrier-ring itself swings outward about the shaft D, the breech-block at that time being fixed in the carrier-ring, as will be hereinafter more fully described.

The lower end of the shaft D is provided with the segmental worm-gear $D^3$, whose worm-teeth $d^2$ mesh with the worm-teeth $h$ on the segmental worm-gear H', keyed fast on the shaft H, journaled across the lower portion of the gun. This worm-gear H' is also provided with a longitudinal groove $h'$ to receive the interrupted annular rib $d^3$, and thus to prevent the wheel H' from revolving except when the worm-teeth $d^2$ engage with the worm-teeth $h$. This shaft H carries, rigidly secured thereto, a protecting-tray K, secured on the arm K' of the frame $K^2$, having the rearwardly-projecting arms $K^3$ and the rounded bosses $K^4$. The tray K is provided with a stiffening-rib $k$.

Figure 1:
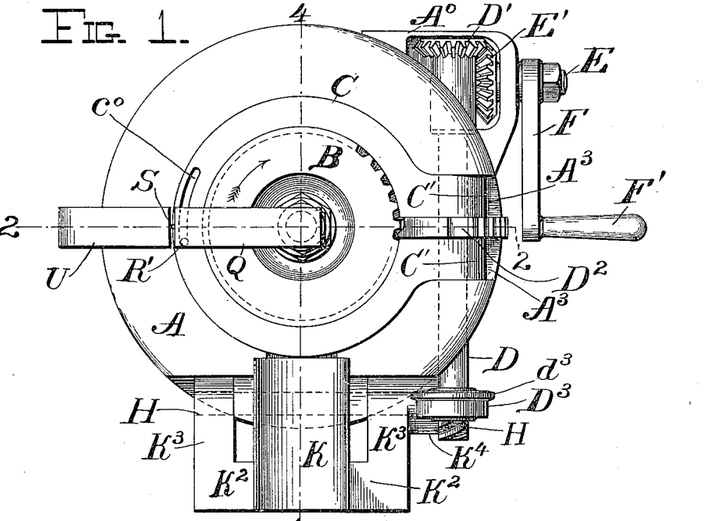
Figure 1 is a rear elevation of the gun, showing the breech locked and the gun ready for firing and the protecting-tray in the lowered position.
Figure 4:
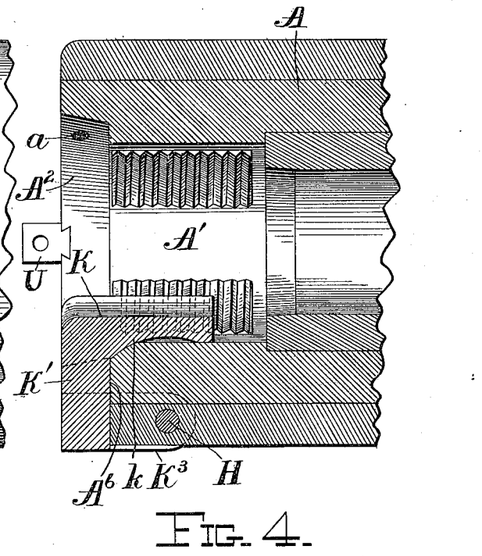
Fig. 4 represents a section through the gun-body along the line 4 4 of Fig. 1, showing the protecting-tray in the raised position ready to receive the shell, but with the breech-block swung clear of the gun.

The segmental worm-gear $D^3$ is so arranged relative to the worm-gear H' that the tray K is in the vertical position (shown in Fig. 1) and clear of the carrier-ring when the latter is at or near the closed position; but as the rotation of the shaft D causes the carrier-ring to swing outward the rib $d^3$ passes out of the groove $h'$ and the worm-teeth $d^2$ engage the worm-teeth $h$, swinging the protecting-tray upward about the shaft H until the said tray projects into the screw-box A' and has its rib $k$ resting in one of the blanks between the screw-threads in the screw-box, as shown in Fig. 4. In this position the rounded bottom of the protecting-tray K receives the shell and holds the same in line with the powder-chamber and clear of the screw-threads of the gun. In this manner the screw-threads are protected from injury from the shell and the latter may be shoved in place from the rear with much greater facility.

Figure 22:
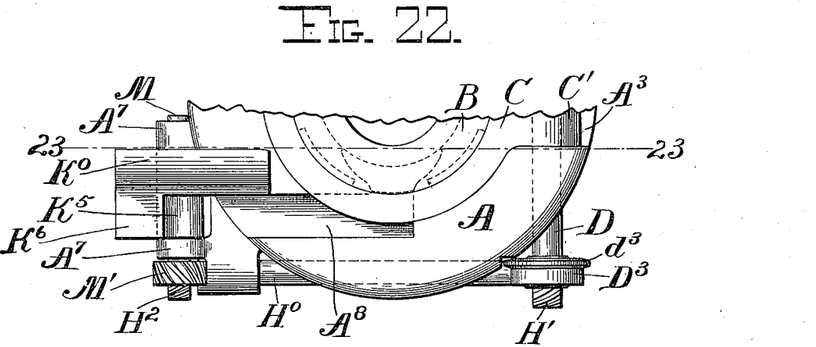
Fig. 22 represents an end view of the lowered portion of the breech of the gun fitted with a protecting-tray that swings into the screw-box from the side of the gun.
Figure 23:
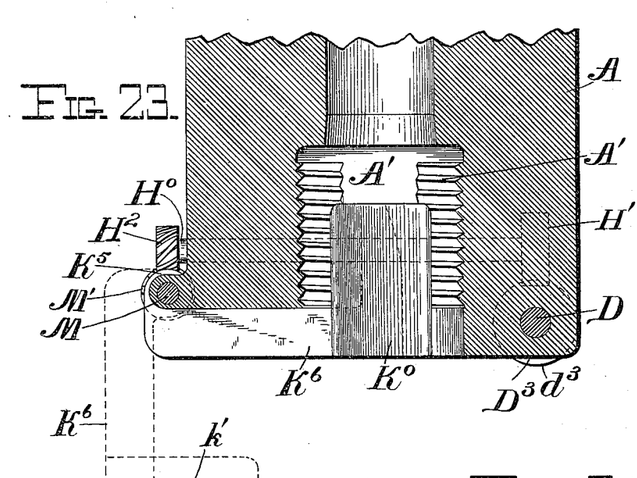
Fig. 23 represents a section along the line 23 23 of Fig. 22 and looking down.

In the modification shown in Figs. 22 and 23 the shaft $H^0$ extends clear across the gun and is provided with a worm-gear $H^2$, meshing with the worm-gear $M'$ on the vertical shaft $M$, to which the swinging tray $K^0$ is rigidly attached, as by means of the arm $K^6$. This tray is preferably provided with a rib $k'$ beneath the same and curved, as at $k^0$, so as to swing freely into the blanks between the screw-threads of the gun. This arm $K^6$ is provided with a rearwardly-projecting boss $K^5$, secured to the shaft $M$, and mounted between the lugs $A^7$, attached to the gun in any convenient way.

The arrangement of the segmental worm-gears $D^3$ and $H'$ is similar to that already described with reference to Figs. 1 to 3 and 9 to 12, so that the shaft $M$ is so rotated that the protecting-tray $K^0$ will not swing toward the screw-box until the carrier-ring has been swung outward and will leave the screw-box before the carrier-ring has been swung inward far enough to cause either the breech-block or the carrier-ring to strike the protecting-tray or any part thereof. Thus it will be seen that I provide a protecting-tray which is automatically swung inward into the screw-box when the carrier-ring is opened and is automatically swung outward from the screw-box as the carrier-ring is swung to the closed position.

Figures 5, 6:
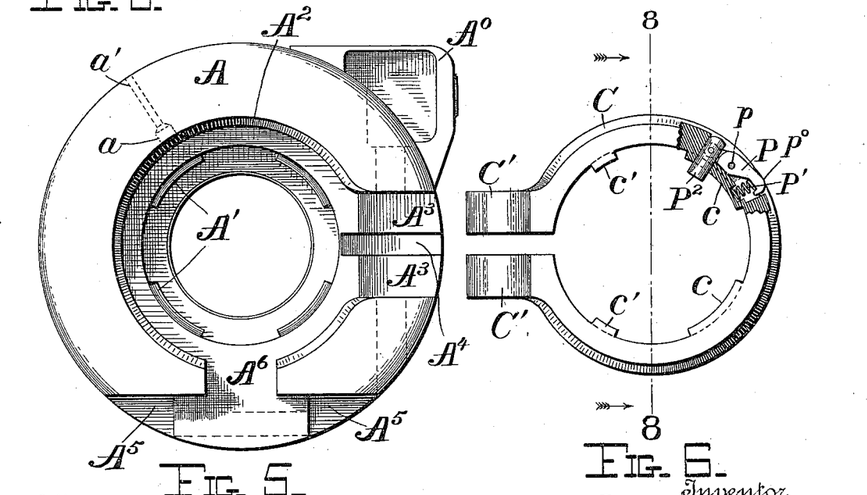
Fig. 5 represents a rear view of the gun-body with the carrier-ring, tray, and breech-block detached from the gun.
Fig. 6 is an elevation, partly in section, of the carrier-ring and illustrates the means for alternately locking the breech-block in the carrier or the carrier in the gun, as the case may be.
Figures 7, 8, 9, 10, 11, 12:
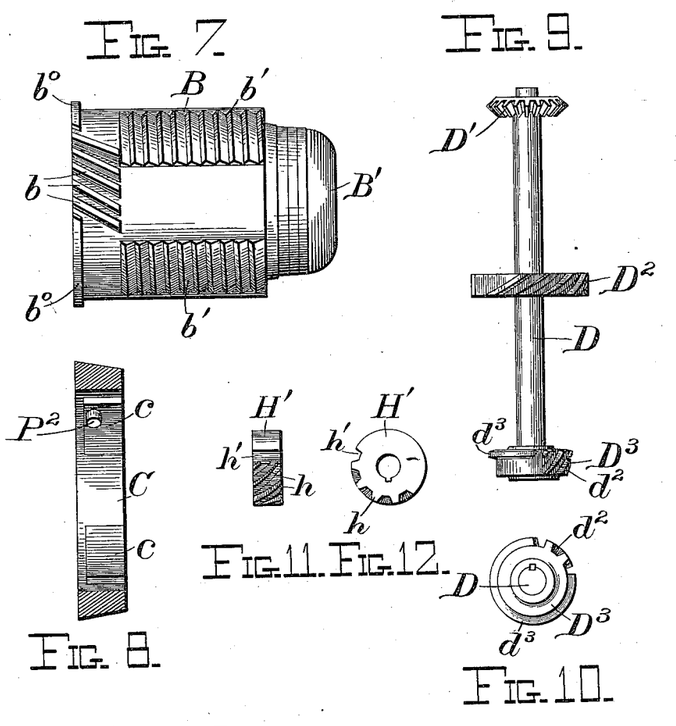
Fig. 7 is a side elevation of the breech-block as detached from the carrier-ring.
Fig. 8 represents a section through the carrier-ring along the line 8 8 of Fig. 6 and looking in the direction of the arrows.
Fig. 9 represents the hinge bolt or shaft on which the carrier-ring is pivoted and shows the gear-wheels for turning the block in the carrier and for swinging the carrier open and also for operating the protecting-tray.
Fig. 10 represents an inverted plan view of the segmental worm-gear for operating the hinge bolt or shaft on which the protecting-tray is mounted.
Figs. 11 and 12 represent, respectively, a side elevation and an end view of the segmental worm-gear fast on the shaft that carries the protecting-tray.
Figure 13:
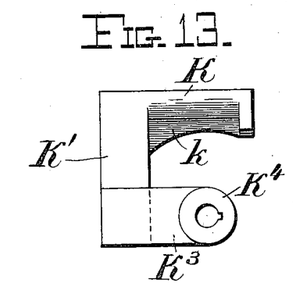
Fig. 13 represents a side elevation of the protecting-tray as detached from the gun.
Figure 13A:
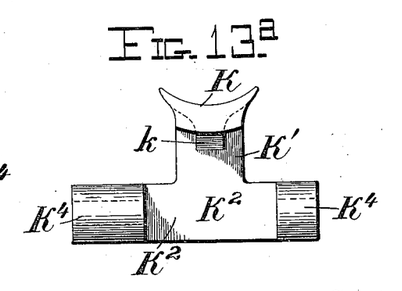
Figure 14:
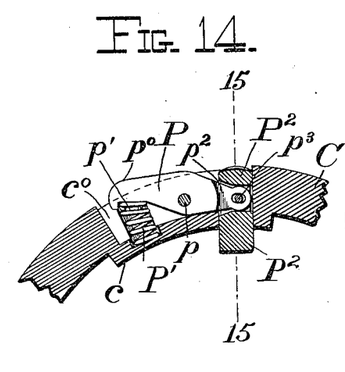
Fig. 14 represents a section through that portion of the carrier-ring shown in the device for locking the breech-block in the carrier-ring or the carrier-ring in the gun, as the case may be, the section being along the line 14 14 of Fig. 15, but the breech-block not being shown.

In order to afford a positively-acting lock for holding the breech-block in the carrier-ring or for holding the carrier-ring locked in the gun, as the case may be, I provide the locking-bolt $p^2$, pivotally connected by means of the arm $p^2$ and pin $p^3$ to the lever $P$, which lever is pivoted in the carrier-ring, as at $p$, (see Fig. 14,) and is provided with a rounded arm $p^0$, normally pressed outward by the spring $P'$. Thus the spring normally presses the arm $p^0$ outward and the locking-bolt $P^2$ inward, as shown in Figs. 6 and 14.

In order to remove or replace the lever $P$, the locking-bolt, and the spring $P'$ at one operation, the spring $P'$ is held in place by the screw-head $p'$ (see Fig. 14) and the locking-bolt is connected to the lever by means of the pin $p^3$; but this pin $p^3$ and also the screw-head $p'$ may be omitted, if desired.

Figure 15:
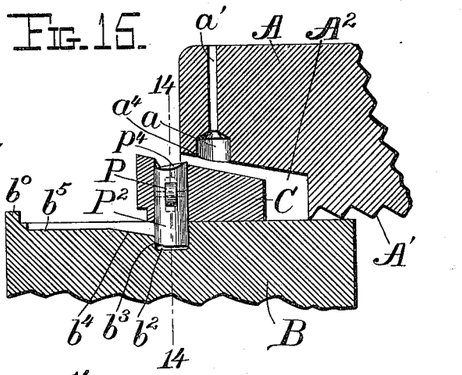
Fig. 15 represents a section across the carrier-ring along the line 15 15 of Fig. 14 and shows the adjacent parts of the breech-block and gun-body, the breech-block being just about to enter or recede from the screw-box.

The conical recess $A^2$ in rear of the screw-box is provided with the recess $a$, preferably opening outward, as at $a'$, that it may be conveniently cleaned out or oil may be dropped in, as may be desired, which recess has an outer shoulder $a^4$, adapted to engage the sloping top $p^4$ of the locking-bolt $P^2$. The breech-block is also provided with a recess $b^2$, adapted to engage the heel of the locking-bolt $P^2$, which recess $b^2$ is provided with the vertical shoulder $b^3$ in front of the sloping face $b^4$, terminating in a longitudinal groove $b^5$. (See Fig. 15.) The parts being in the open position, (shown in Figs. 14 and 15,) if the carrier-ring is swung inward the rounded arm $p^0$ of the lever $P$ will be depressed, raising the locking-bolt $P^2$ clear of the recess $b^2$ in the plug. When the carrier-ring reaches its seat, the forward motion of the plug in the carrier will cause the inclined surface $b^4$ to wedge the pin $P^2$ up into the recess $a$, thus locking the carrier in the gun, but at the same time permitting the plug to travel forward the length of the longitudinal groove $b^5$. When thus locked, the rounded surface $P^0$ is slightly beneath the surface of the carrier-ring.

In opening the breech the first motion will be to unlock the breech-block from engagement with the screw-threads in the screw-box and then to run the latter to the rear. As the plug is drawn to the rear the bolt $P^2$ is forced down the inclined surface $b^4$ by the action of the spring $P^8$ pressing upward on the opposite end of the lever $P$. When the recess $b^2$ comes under the bolt $P^2$, the upper edge of the bolt is just clear of the rear edge $a^4$ of the recess $a$, permitting the carrier-ring to move to the rear. As the carrier-ring moves to the rear the rounded surface $p^0$ on the lever $P$ is forced up by the spring and the bolt $P^2$ is forced down into the recess $b^2$. In case the spring fails to act the inclined surface $P^4$ on top of the bolt $P^2$ insures the bolt entering the recess $b^2$ before the ring can be swung back, and thus the breech-plug will be firmly locked in the carrier-ring before the latter can be swung clear of the gun. Thus it will be seen that the breech-block cannot be moved forward in the carrier-ring until the carrier-ring has been locked in the gun, nor can the carrier-ring be unlocked from the gun until the breech-block has been unlocked from the gun and moved to its rearward position in the carrier-ring.

Figure 24:
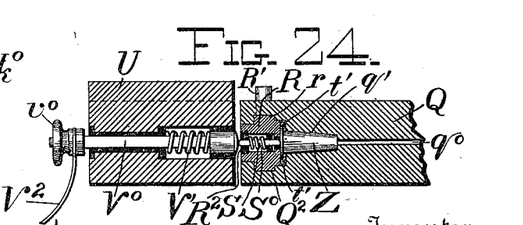
Fig. 24 represents a modification in which the primer is fired by electricity.

The firing mechanism used with the herein-described invention may be either mechanical, as shown in Figs. 1, 2, 17, and 19, or electrical, as shown in Fig. 24. In either form of firing mechanism the stem $B^2$ of the obturator is provided with a vent $b^0$ and has attached to the stem thereof the elbow-housing $Q$, provided with the vent $q^0$, opening into the vent $b^0$. At the other end of this vent $q^0$ I provide a primer-chamber $q'$ for the cartridge-case $Z$ of the primer, which chamber $q'$ is closed by means of the sliding wedge-block $R$, perforated to receive the firing-pin. This sliding wedge-block $R$ is provided with ribs $r$, sliding in grooves $Q^2$, preferably set at a slight angle with the axis of the vent $q^0$, so that the block $R$ may bear against the rear face of the primer-chamber when the latter is closed.

The rear end of the opening in which the firing-pin is mounted is closed by a perforated nut $R^2$, and the firing-pin is normally pressed rearward out of engagement with the primer-cap by means of the spring $S'$. In the form of device shown in Figs. 17 and 18 the firing-pin $S$ projects through a cylindrical opening $r^0$ in the block $R$, while in the form of device shown in Fig. 24 the firing-pin $S^0$ is insulated from the block $R$. With either form of device the block R is provided with a stud R', which projects beyond the side of the housing Q and when the block is in the closed position engages in the recess $Q^3$ in the side of the housing Q. (Shown in Fig. 16.) This stud R' engages in the arc-shaped groove $c^0$ in the carrier-ring C. The center of this arc-shaped groove $c^0$ is the same as the center of the breech-block, and when the carrier-ring is swung to the closed position this center lies in the continuation of the axis of the bore. The angle subtended by this arc-shaped groove $c^0$ is somewhat less than the angle of rotation of the breech-block, so that when the breech-block is rotated to the unlocked position the housing Q, moving in the direction indicated by the arrow in Fig. 1, this stud R' will strike the upper end of the groove $c^0$ and will force the block R downward, opening the rear of the primer-chamber, while in the reverse operation of closing the block the housing Q will swing downward until the stud R' strikes the lower end of the groove $c^0$, when the breech-block is forced upward into the position for closing the rear of the powder-chamber, at which time the stud R' will engage in the recess $Q^3$ of the housing Q.

The top of the breech-block is preferably recessed, as at $r'$, to admit the convenient insertion of the primer cartridge-case from the rear, and the front face of the block is sloped, as at $r^3$, to wedge the primer-case into the primer-chamber as the block rides up into the closed position.

Figures 16, 17, 18, 19, 20, 21:
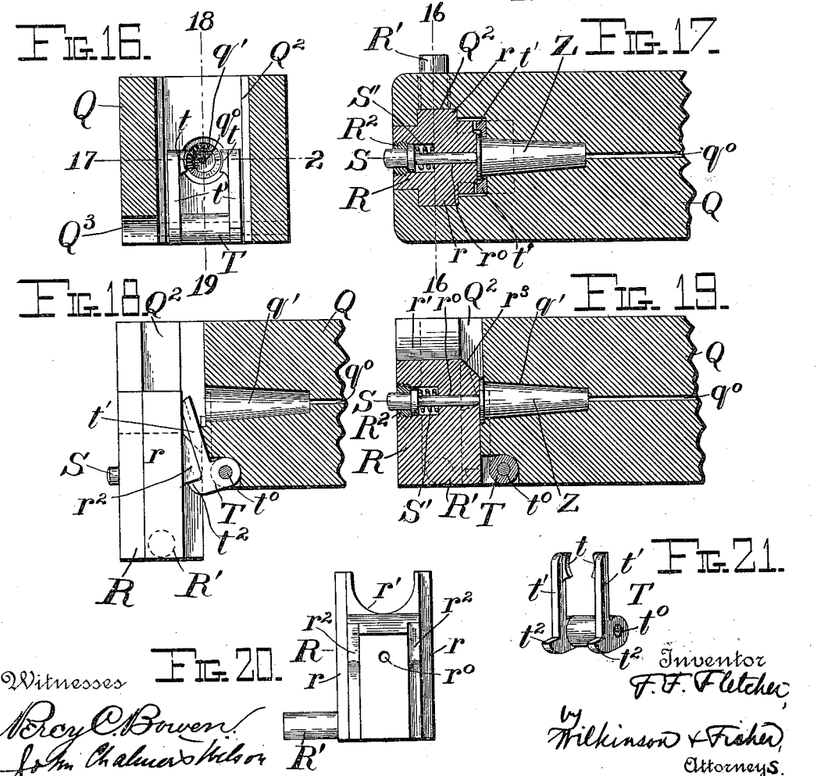
Fig. 16 represents a section through the housing of the sliding wedge-block for closing the primer-chamber along the line 16 16 of Fig. 17, the sliding block being then removed, but the extractor for the primer-case being in position.
Fig. 17 represents a section through the sliding wedge-block for closing the primer-chamber and the housing therefor along the line 19 2 of Fig. 16 and along the line 2 2 of Fig. 1, the primer-case being shown in plan.
Fig. 18 represents a section along the line 18 19 of Fig. 16, the sliding wedge-block for closing the primer-chamber being in the lowered open position and the primer-case being ejected.
Fig. 19 represents a similar view of that shown in Fig. 18 except that the sliding wedge-block is in the closed position and the primer and other parts are in position for firing.
Fig. 20 represents a rear elevation of the sliding wedge-block for closing the primer-chamber.
Fig. 21 represents a perspective view of the extractor for removing the empty primer cartridge-case.

In order to provide for the extraction of the empty cartridge-case of the primer after the latter has been fired, the extractor T is pivoted, as at $t^0$, in the housing Q, which extractor has the arm $t'$, with nibs $t$ engaging the rim of the cartridge-case. On the back of these arms are the lugs $t^2$, which engage the double inclined lugs $r^2$ on the block R. It will be seen that as the block is moved to the lower or open position, as shown in Fig. 18, the lower edges of these lugs $r^2$ will engage the lugs $t^2$, rotating the extractor outward and ejecting the empty cartridge-case, while in returning to the closed position the upper incline of these lugs $r^2$ will press against the back of the arms $t'$ and will bring the extractor to the closed position with the nibs in front of the rim of the cartridge-case, as shown in Fig. 17.

Figure 2:
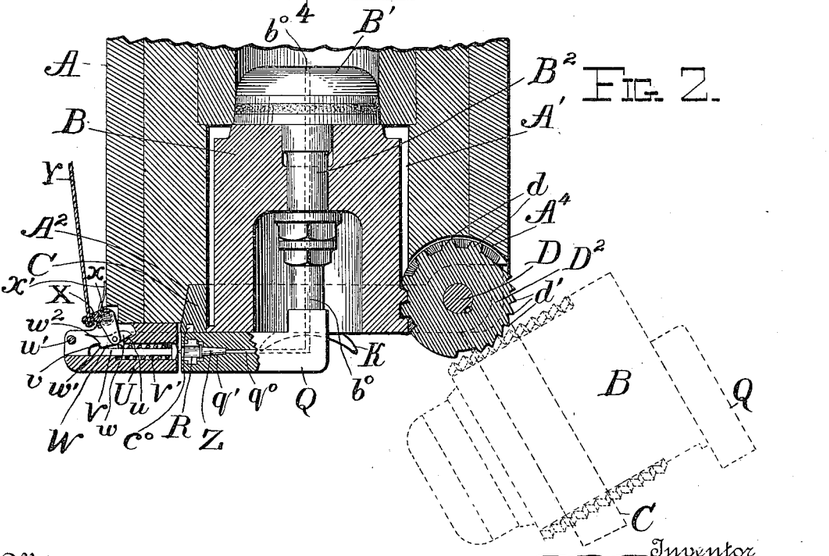
Fig. 2 represents a section along the line 2 2 of Fig. 1 and looking down, the obturator being shown in elevation.
Figure 3:
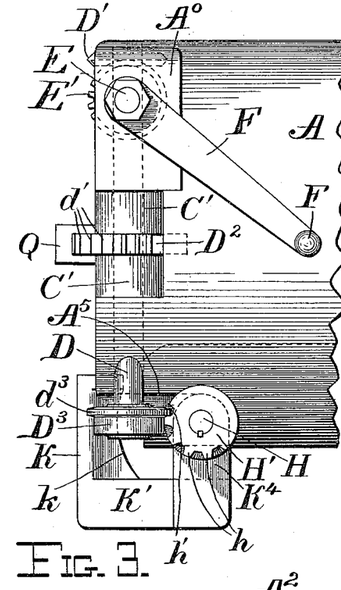
Fig. 3 is a side elevation of the breech of the gun as seen from the right of Fig. 1.

In the mechanically-operated firing mechanism shown in Fig. 2, U represents a frame or casing engaging in the dovetail recess $a^4$ of the gun-body (see Fig. 4) and provided with a plunger V, normally pressed forward by the spring V'. This plunger has a notch $v$, normally engaging the catch $w'$ of the pawl W, the opposite arm $w$ of which pawl at that time rides up over the lug $u$ of the housing. This pawl W is pivoted on one arm of the bell-crank lever X, to the other arm of which is attached the lanyard Y. This bell-crank lever X is pivoted, as at $x$, and is acted upon by a spring $x'$, whose tension is in the opposite direction to that exerted by the lanyard Y, tending to bring back the pawl W in position to engage the notch $v$ whenever the tension on the lanyard, as in firing the gun, has been relieved.

When the lanyard Y is pulled upon, the pawl W is moved backward, drawing with it the bolt V until the curved arm $w^2$ of the pawl W rides up on the stud $u'$ of the housing U, at which time the catch $w'$ is wedged out of engagement with the notch $v$ and the plunger V is released, being driven forward by the spring V' and striking the firing-pin S, when it fires the primer, which transmits the flame through the vents $q^0$ and $b^0$ to the powder charge in the gun.

In the electric firing mechanism shown in Fig. 24 the plunger $V^0$ is normally pressed inward by means of the spring V' and makes contact with the insulated firing-pin $S^0$. The plunger is insulated, as shown, and is provided with a milled headed nut $b^0$, which screws over the end of the plunger and serves to hold in place the end of the wire $V^2$, leading from a battery or other source of electricity. The other terminal of the battery is connected with any part of the gun or gun-mount, as is ordinarily done when firing by electricity. In either form of the firing mechanism it will be seen that the firing-pin and the plunger are not in the operative position until the breech-block is closed and locked and until the primer-chamber is also closed. Thus protection against premature discharges is had.

It will be obvious that either form of firing mechanism may be used with the breech opening and closing apparatus and also with the mechanism for operating the tray. It will also be obvious that various modifications in the herein-described apparatus might be made by any one skilled in the art without departing from the spirit of my invention.

Having thus described my invention, what I claim, and desire to secure by Letters Patent of the United States, is—

1. In a breech mechanism of the slotted-screw system, the combination with a breech-plug and a hinged carrier for the same, of a shaft for said carrier, a pinion secured to said shaft for operating the breech-block and carrier, a crank and cogged gearing connecting said crank and said shaft for operating the mechanism by a continuous motion of the crank, a swinging protecting-tray, and means operated by the rotation of said shaft for swinging said tray into and out of the screw-box, substantially as described.

2. In a breech mechanism of the slotted-screw system, the combination with a breech-plug and a hinged carrier for the same, of a shaft for said carrier, a pinion secured to said shaft for operating the breech-block and carrier, a frame on the side of the gun, a hand-crank journaled in said frame, and cogged gearing connecting said hand-crank and said shaft or hinged bolt, a swinging protecting-tray, and means operated by the rotation of said shaft for swinging said tray into and out of the screw-box, substantially as described.

3. In a breech mechanism of the slotted-screw system, the combination with a breech-plug and a hinged carrier for the same, of a shaft for said carrier, a pinion secured to said shaft for operating the breech-block and carrier, a frame on the side of the gun, a counter-shaft journaled in said frame at right angles to the axis of the gun, a hand-crank at one end of said counter-shaft and a gear-wheel at the other, a second gear-wheel fast on the first shaft and meshing with the gear-wheel on the counter-shaft for operating the mechanism by a continuous motion of the crank, a swinging protecting-tray, and means operated by the rotation of said shaft for swinging said tray into and out of the screw-box, substantially as described.

4. In a breech mechanism of the slotted-screw system, the combination with a breech-plug and a hinged carrier for the same, of a shaft for said carrier, a pinion secured to said shaft for operating the breech-block and carrier, a crank, and cogged gearing connecting said crank and said shaft for operating the mechanism by a continuous motion of the crank, a protecting-tray pivoted to the gun, and means operated by the rotation of the shaft for automatically swinging said tray into and out of the screw-box, substantially as described.

5. In a breech mechanism of the slotted-screw system, the combination with a breech-plug and a hinged carrier for the same, of a shaft for said carrier, a pinion secured to said shaft for operating the breech-block and carrier, a frame on the side of the gun, a hand-crank journaled in said frame, and cogged gearing connecting said hand-crank and said shaft, a swinging protecting-tray pivoted to the gun, and means operated by the rotation of the shaft for automatically swinging said tray into and out of the screw-box, substantially as described.

6. In a breech mechanism of the slotted-screw system, the combination with a breech-plug and a hinged carrier for the same, of a shaft for said carrier, a pinion secured to said shaft for operating the breech-block and carrier, a frame on the side of the gun, a counter-shaft journaled in said frame at right angles to the axis of the gun, a hand-crank at one end of said counter-shaft, and a gear-wheel at the other a second gear-wheel fast on the first shaft and meshing with the gear-wheel on the counter-shaft for operating the mechanism by a continuous motion of the crank, a swinging protecting-tray pivoted to the gun, and means operated by the rotation of the first shaft for automatically swinging said tray into and out of the screw-box, substantially as described.

7. In a breech mechanism of the slotted-screw system, the combination with a breech-plug and a hinged carrier for the same, of a shaft for said carrier, a pinion secured to said shaft for operating the breech-block and carrier, a crank, and cogged gearing connecting said crank and said shaft for operating the mechanism by a continuous motion of the crank, a swinging protecting-tray, a transverse shaft for operating said protecting-tray, and worm-gearing automatically operated by the rotation of the first shaft for turning said transverse shaft, substantially as described.

8. In a breech-loading gun, the combination with mechanism for opening and closing the breech, of a swinging protecting-tray pivoted to the gun, and means automatically operated by the breech mechanism for swinging said tray into the screw-box when the breech is opened, and for swinging said tray out of the screw-box before the breech is closed, substantially as described.

9. In a breech-loading gun, the combination with mechanism for opening and closing the breech, of a swinging protecting-tray pivoted to the gun, and interrupted worm-gearing automatically operated by the breech mechanism for swinging said tray into the screw-box during the latter part of the operation of opening the breech, and for swinging said tray out of the screw-box during the early part of the operation of closing the breech, substantially as described.

10. In a breech-loading gun, the combination with a breech-block, a hinged carrier, a hinge-bolt, and means for turning said hinge-bolt, and means operated by the rotation of the hinge-bolt for opening and closing the breech, a swinging protecting-tray pivoted to the gun, and means automatically operated by the rotation of the hinge-bolt for swinging said tray into and out of the breech of the gun, substantially as described.

11. In a breech-loading gun, the combination with a breech-block, a hinged carrier, a hinge-bolt, and means for turning said hinge-bolt, and means operated by the rotation of the hinge-bolt for opening and closing the breech, of a swinging protecting-tray pivoted to the gun, and interrupted worm-gearing operated by the rotation of the hinge-bolt for automatically swinging said tray into and out of the screw-box, substantially as described.

12. In a breech-loading gun, the combination with a breech-block, a hinged carrier, a hinge-bolt, and means for turning said hinge-bolt, and means operated by the rotation of the hinge-bolt for opening and closing the breech, a swinging protecting-tray, a transverse shaft for operating said protecting-tray, and interrupted worm-gearing automatically operated by the rotation of the hinge-bolt for turning said transverse shaft, substantially as described.

13. In a breech mechanism, the combination of a hinge-bolt, a shaft, an oscillating protecting-tray mounted on said shaft and automatically operated by interrupted gearing on said hinge-bolt and shaft, substantially as described.

14. In a breech-loading gun of the slotted-screw system, the combination with a breech-block provided with screw-threads thereon for locking the same in the gun, and worm-teeth in rear of said screw-threads, of a pinion provided with teeth to engage in said worm-teeth, and other teeth to engage in said screw-threads, mechanism for operating said pinion, a swinging protecting-tray pivoted to the gun, and means automatically operated by said mechanism for swinging said tray into the screw-box as the breech is opened and for removing the said tray before the breech is closed, substantially as described.

15. In a breech-loading gun, provided with a chamber in rear of the screw-box, and a small recess extending outward from said chamber, the combination of a pivoted carrier-ring adapted to swing into said chamber, a breech-block mounted in said carrier-ring and provided with an inclined groove therein registering with the recess in the gun when the breech-block is inserted in the gun, a lever pivoted in said carrier-ring and having an arm normally projecting therefrom, and a locking-bolt operated by said lever and by said inclined recess to lock the carrier-ring in the gun when the breech is closed, with means for removing the locking-bolt from engagement with the gun when the breech is opened, substantially as described.

16. In a breech-loading gun, provided with a conical chamber in rear of the screw-box, and a small recess extending outward from said chamber, the combination of a pivoted carrier-ring adapted to swing into said chamber, a breech-block mounted in said carrier-ring and provided with an inclined groove therein registering with the recess in the gun when the breech-block is inserted in the gun, a lever pivoted in said carrier-ring and having an arm normally projecting therefrom, a locking-bolt attached to said lever and provided with a beveled head engaging the wall of said conical chamber and having its heel engaging in the inclined recess in the breech-block, substantially as described.

17. In a breech-loading gun, provided with a conical chamber in rear of the screw-box, and a small recess extending outward from said chamber, the combination of a pivoted carrier-ring adapted to swing into said chamber, a breech-block mounted in said carrier-ring and provided with an inclined groove therein registering with the recess in the gun when the breech-block is inserted in the gun, a lever pivoted in said carrier-ring and having an arm normally projecting therefrom, a locking-bolt attached to said lever and provided with a beveled head engaging the wall of said conical chamber and having its heel engaging in the inclined recess in the breech-block, and a spring normally pressing said arm of said lever outward, substantially as described.

18. In a breech-loading gun of the slotted-screw system, the combination with a breech-plug provided with a vent a housing fast to said plug and a primer-chamber mounted on said housing, and opening into said vent, of a sliding block automatically operated by the revolution of the breech-plug for opening and closing said primer-chamber, and a self-cocking firing device secured to the breech of the gun and registering with said primer-chamber when the breech is closed, substantially as described.

19. In a breech-loading gun of the slotted-screw system, the combination with a breech-plug provided with a vent a housing fast to said plug and a primer-chamber mounted in said housing, and opening into said vent, of a sliding block automatically operated by the revolution of the breech-plug for opening and closing said primer-chamber, an extractor for the empty primer-case operated by the motion of the sliding wedge-block, and self-cocking firing device secured to the breech of the gun and registering with said primer-chamber when the breech is closed, substantially as described.

20. In a breech-loading gun, of the slotted-screw system, the combination of a hinged carrier provided with an arc-shaped groove therein subtending a less angle than the angle of revolution of the breech-plug, a breech-plug mounted in said carrier, and provided with a laterally-extending housing, with a primer-chamber in said housing and a vent connecting said primer-chamber with the bore of the gun, and a sliding wedge-block mounted in said housing and provided with a lug projecting into said groove in the carrier, substantially as described.

21. In a breech-loading gun of the slotted-screw system, the combination of a hinged carrier provided with an arc-shaped groove therein subtending a less angle than the angle of revolution of the breech-plug, a breech-plug mounted in said carrier, and provided with a laterally-extending housing, with a primer-chamber in said housing and a vent connecting said primer-chamber with the bore of the gun, and a sliding wedge-block mounted in said housing and provided with a lug projecting into said groove in the carrier, with an extractor for the empty primer-case also mounted in said housing and operated by the motion of the sliding wedge-block, substantially as described.

22. In a breech-loading gun of the slotted-screw system, the combination of a hinged carrier provided with an arc-shaped groove therein subtending a less angle than the angle of revolution of the breech-plug, said breech-plug mounted in said carrier, and provided with a laterally-extending housing, with a primer-chamber in said housing and a vent connecting said primer-chamber with the bore of the gun, and a sliding wedge-block mounted in said housing and provided with a lug projecting into said groove in the carrier, with an extractor for the empty primer-case also mounted in said housing and operated by the motion of the sliding wedge-block, and a self-cocking firing device secured to the breech of the gun, substantially as described.

23. In a breech-loading gun of the slotted-screw system, the combination of a hinged carrier provided with an arc-shaped groove therein subtending a less angle than the angle of revolution of the breech-plug, the breech-plug mounted in said carrier and provided with a laterally-extending housing, with a primer-chamber in said housing, and a vent connecting said primer-chamber with the bore of the gun, and a sliding wedge-block mounted in said housing and provided with a lug projecting into said groove in the carrier, with means for firing said primer operative only when the breech-plug is closed and locked in the gun and the sliding wedge-block has closed the primer-chamber, substantially as described.

24. In a breech-loading gun of the slotted-screw system, a firing mechanism composed of two separable parts, one part secured to the breech of the gun, and the other part secured to the breech-plug and provided with a primer-chamber, the two parts registering only when the breech-plug is closed and locked in the gun and the primer-chamber is closed, substantially as described.

25. In a breech-loading gun of the slotted-screw system, a firing mechanism composed of two separable parts, one part secured to the breech of the gun, and the other part secured to the breech-plug and provided with a primer-chamber, the two parts registering only when the breech-plug is closed and locked in the gun and the primer-chamber is closed, in combination with means automatically operated by the rotation of the breech-plug about its axis for closing the primer-chamber and causing the two parts of the firing mechanism to register with each other in the operative position, substantially as described.

In testimony whereof I affix my signature in presence of two witnesses.

FRANK F. FLETCHER.

Witnesses:
FRANK D. BLACKISTONE,
J. STEPHEN GIUSTA.